(12) United States Patent
Bier et al.

(10) Patent No.: US 7,578,034 B2
(45) Date of Patent: Aug. 25, 2009

(54) COLLAR STAY PUNCH, STORAGE DEVICE AND METHOD

(75) Inventors: Jason J. Bier, Chicago, IL (US); Joshua A. Gutstein, Chicago, IL (US)

(73) Assignee: BG & Sons, LLC, Chicago, IL (US)

( * ) Notice: Subject to any disclaimer, the term of this patent is extended or adjusted under 35 U.S.C. 154(b) by 1169 days.

(21) Appl. No.: 10/440,592

(22) Filed: May 19, 2003

(65) Prior Publication Data

US 2004/0231474 A1  Nov. 25, 2004

(51) Int. Cl.
  *A44B 13/02* (2006.01)
  *A41B 3/00* (2006.01)
  *B26D 3/00* (2006.01)
  *A47G 29/10* (2006.01)
  *A41D 27/16* (2006.01)

(52) U.S. Cl. ............ 24/3.6; 24/643; 24/598.5; 24/598.8; 2/131; 2/132; 2/60; 206/37.1; 206/775; 206/814; 206/248; 70/459; 235/487; 235/494; 223/84; D11/202

(58) Field of Classification Search .......... 83/685, 83/167, 13, 588, 633, 686, 680; 70/456 R, 70/456, 458, 459, 457, 16–19, 58; 24/3.6, 24/643, 644, 645, 652, 900.1, 916, 50, 51, 24/61, 41.1, 598.5, 599.8, 599.5; 206/37.1, 206/37.4, 37.5, 38.1, 775, 814, 248; 2/132, 2/131, 239, 129, 141, 60; D11/202; D19/72; 223/84, 83, 82, 81, 52.1, 52.2, 52.4, 72
See application file for complete search history.

(56) References Cited

U.S. PATENT DOCUMENTS

| | | | | |
|---|---|---|---|---|
| 854,583 A | * | 5/1907 | Lee | ............. 24/369 |
| 1,214,205 A | * | 1/1917 | Mariner | ............. 24/561 |
| 1,518,763 A | * | 12/1924 | Williams | ............. 24/61 |
| 1,742,915 A | * | 1/1930 | Smith et al. | ........... 206/37.5 |
| 1,874,851 A | * | 8/1932 | Baer | ............. 24/488 |
| 2,146,227 A | * | 2/1939 | Pyros | ............. 2/132 |

(Continued)

OTHER PUBLICATIONS

International Search Report.

(Continued)

*Primary Examiner*—Ghassem Alie
(74) *Attorney, Agent, or Firm*—Whyte Hirschboeck Dudek SC; Ted J. Barthel (57) ABSTRACT

A collar stay perforating device for perforating a portion of a collar stay and a collar stay storage device for storing the perforated collar stay are provided. The collar stay perforating device comprises a base member having a punch hole and a guide to receive an end of a collar stay. A first lever member pivotally attached to the base member has a punch member that cooperates with the punch hole. A second lever member pivotally attached to the base member bears on the first lever member to bring the punch member into cooperation with the punch hole thereby perforating the collar stay. The perforated collar stay may then be stored on a collar stay storage device comprising an openable ring member having releaseably engageable arms for forming a closed loop. The ring is openable permitting one of the arms to be inserted through the perforated collar stay thereby providing ordered and compact storage of collar stays.

9 Claims, 8 Drawing Sheets

U.S. PATENT DOCUMENTS

| | | | |
|---|---|---|---|
| 2,188,367 A | | 1/1940 | Loercher |
| 2,423,776 A | * | 7/1947 | Humpola ........................ 2/132 |
| 2,540,782 A | | 2/1951 | Hansen |
| 2,620,481 A | * | 12/1952 | Florkewicz .................... 2/132 |
| 2,783,637 A | * | 3/1957 | Brunner ...................... 70/458 |
| 3,039,112 A | * | 6/1962 | Sucher ......................... 2/132 |
| 3,069,890 A | | 12/1962 | McKinney et al. ........ 70/456 R |
| 3,075,202 A | * | 1/1963 | Rubio ............................ 2/132 |
| 3,192,747 A | * | 7/1965 | Stupell et al. ............. 70/456 R |
| 3,242,709 A | | 3/1966 | Cobb |
| 3,430,264 A | * | 3/1969 | Beukenkamp, Jr. ............. 2/116 |
| 3,682,216 A | * | 8/1972 | Nelson ....................... 150/106 |
| D225,301 S | * | 12/1972 | Silvio et al. .................. D8/348 |
| 3,707,742 A | * | 1/1973 | Justice et al. ................ 24/377 |
| 3,742,963 A | * | 7/1973 | Creamer .................... 131/258 |
| 3,776,009 A | | 12/1973 | MacGlashan |
| 3,832,737 A | * | 9/1974 | Podolsky ....................... 2/132 |
| 3,909,850 A | * | 10/1975 | Scott ............................. 2/132 |
| 3,913,362 A | * | 10/1975 | Goessling et al. ............. 70/459 |
| 3,952,382 A | * | 4/1976 | Vaage ........................ 24/598.5 |
| 3,956,804 A | | 5/1976 | Gatof et al. ................ 24/598.5 |
| 4,118,803 A | * | 10/1978 | Blau ............................ 2/132 |
| 4,166,404 A | | 9/1979 | Almog |
| 4,169,753 A | * | 10/1979 | Wendell .................... 156/160 |
| 4,240,572 A | | 12/1980 | Mitsuhashi |
| 4,289,003 A | * | 9/1981 | Yang ........................ 70/456 B |
| 4,376,383 A | * | 3/1983 | Wolter ...................... 70/456 R |
| D283,978 S | * | 5/1986 | Mills ........................... D8/347 |
| 4,776,191 A | | 10/1988 | MacDonald |
| 4,903,514 A | * | 2/1990 | Jung ........................ 70/456 R |
| 4,932,230 A | | 6/1990 | Ishii et al. |
| D309,473 S | * | 7/1990 | Toy ............................. D19/34 |
| 4,975,983 A | * | 12/1990 | Everett ............................ 2/60 |
| 5,079,411 A | * | 1/1992 | Lee ............................ 235/382 |
| 5,247,863 A | | 9/1993 | Cohen |
| 5,303,571 A | * | 4/1994 | Quinn et al. .................. 72/336 |
| 5,323,538 A | | 6/1994 | Sutterlin |
| 5,377,415 A | | 1/1995 | Gibson |
| 5,386,638 A | | 2/1995 | Weber |
| 5,423,124 A | | 6/1995 | Marrocco |
| 5,430,914 A | * | 7/1995 | Patterson et al. ........... 24/598.5 |
| 5,586,374 A | * | 12/1996 | Nishida .................... 24/599.8 |
| 5,605,067 A | * | 2/1997 | Juan ............................ 70/413 |
| 5,606,782 A | * | 3/1997 | Patterson et al. ........... 24/598.5 |
| 5,626,267 A | * | 5/1997 | Peruski ........................ 223/84 |
| 5,660,490 A | * | 8/1997 | Warrington .................. 402/36 |
| 5,769,288 A | * | 6/1998 | Berglund ..................... 223/84 |
| 5,806,356 A | | 9/1998 | Lee |
| 5,863,076 A | * | 1/1999 | Warther ....................... 283/74 |
| 5,867,877 A | * | 2/1999 | Patterson et al. ........... 24/598.5 |
| 5,956,985 A | * | 9/1999 | Chang ...................... 70/456 R |
| 6,003,352 A | * | 12/1999 | Yu ............................... 70/459 |
| 6,076,447 A | | 6/2000 | Damask |
| D443,640 S | | 6/2001 | Schapiro |
| 6,286,745 B1 | | 9/2001 | Ackeret |
| 6,325,024 B1 | * | 12/2001 | Masukawa .................. 119/858 |
| 6,401,931 B1 | * | 6/2002 | Javell et al. ................ 206/775 |
| 6,526,597 B1 | * | 3/2003 | Shepard ......................... 2/255 |
| 6,654,990 B2 | * | 12/2003 | Liu ........................... 24/598.5 |
| D493,840 S | * | 8/2004 | Best et al. .................... D20/27 |
| 7,065,195 B1 | * | 6/2006 | Smith et al. ............ 379/144.01 |
| 2005/0120460 A1 | * | 6/2005 | Friedman ....................... 2/129 |
| 2005/0160520 A1 | * | 7/2005 | Forrest .......................... 2/255 |

OTHER PUBLICATIONS

Written Opinion of the International Searching Authority.

\* cited by examiner

COLLAR STAY PUNCH, STORAGE DEVICE AND METHOD

FIELD OF THE INVENTION

This invention relates to a collar stay punch device that perforates a collar stay as well as a corresponding collar stay storage device adapted to store perforated collar stays.

BACKGROUND OF THE INVENTION

Collar stays, a common garment accessory, are made of thin, narrow plastic or metal and are inserted into a stitched slot under the collar of shirts and/or blouses. Once positioned under the collar, collar stays provide additional stiffness to the collar and prevent the collar points from curling. Collar stays thereby assist a person in presenting a crisp and well-groomed appearance.

Despite the aesthetic advantages of a prim appearance provided through the use of collar stays, collar stays themselves are prone to disarray and disorder during periods of non-use. The very nature of collar stays (i.e., thin, small strips of plastic or metal) tends to subject collar stays to detrimental bending, breakage or misplacement when not in use. Collar stays also have the tendency to migrate toward maximum disorder in storage areas such as drawers, closet spaces, toiletry kits, purses, suitcases or dressers, for example. Locating a workable pair of collar stays in the midst of broken or scattered collar stays, particularly when one is away on travel, not only complicates one's daily grooming regimen but also wastes time and breeds undue frustration.

Consequently, a need exists for a storage device that maintains collar stays in an orderly arrangement and promotes rapid and accessible retrieval of collar stays. A need further exists for a collar stay storage device that is compact and portable for use during travel.

SUMMARY OF THE INVENTION

In accordance with the present invention, a device for perforating collar stays and a corresponding device for storing perforated collar stays are provided. The device for perforating a collar stay includes a base member having a punch hole and a guide adapted to receive a portion of a collar stay over the punch hole. A first lever member is pivotally attached to the base member and has a punch member extending from the inner surface. The punch member cooperates with the punch hole. A second lever member is pivotally attached to the base member and has an inner bearing surface which bears on the outer surface of the first lever member when the second lever member is moved toward the base plate. The bearing surface is preferably made from a wear-resistant material. The downward movement of the second lever member subsequently moves the punch member toward the guide plate bringing the punch member into full cooperation with the punch hole to perforate a collar stay when the collar stay is inserted in the guide. The punch member pushes and discharges the resulting perforate through an orifice in the base member, discharging the perforate from the device.

Preferably, a housing is secured to the base member and encloses the first lever member. The housing includes an opening to accommodate the pivotable movement of the second lever member. The housing includes a latch to close the second lever member into the housing opening with a top panel of the second lever member extending over a portion of the housing top surface yielding a compact, closed configuration of the collar stay perforating device. Leaf springs located between the base member and the first lever member urge the outer surface of the first lever member to bear on the inner surface of the second lever member. When the latch is released, the first lever member urges the second lever member to rise above the housing, placing the device in an open or otherwise operational configuration. In the open configuration, a collar stay may be readily inserted into the guide and perforated as previously described.

Preferably, the punch member has a sharpened cutting surface with a sharpened protruding edge. The protruding edge is located on a portion of the punch member proximate the pivot attachment of the first lever member. Positioning the protruding edge in this manner provides additional torque when the punch member is brought in cooperation with the punch hole. The protruding edge also contributes to reduce the amount of force required to form a perforation by forming an initial puncture hole in the collar stay. The remainder of the cutting surface subsequently initially engages the collar stay at the hole extending therefrom to cut out the remaining area of the perforate. This reduces the shearing force required to form the perforation when compared to the perforation force required with simultaneous engagement of the entire cutting surface upon the collar stay.

The combined lever length offered by the double lever configuration of the collar stay perforating device provides adequate torque to perforate a collar stay with the application of minimal force to the second lever member. Once a collar stay is inserted into the guide, a user may simply place the base member and the second lever member between the thumb and forefinger and squeeze the device by bringing the thumb and forefinger towards each other in a closing motion. Thus, the closing force imparted by the hand of the average person is typically more than adequate to perforate conventional collar stays with the perforating device. Consequently, the collar stay perforating device is suitable for perforating collar stays of various compositions, such as plastic and metal, as well as collar stays of various widths and thicknesses. The collar stay perforating device is compact and durable and is equally suited for use at home or during travel.

In accordance with another aspect of the present invention, a device for storing perforated collar stays is provided and includes first and second arcuate members and a housing for maintaining the arcuate members in a pivotable relation to each other. A spring member within the housing is disposed between the first and second arcuate members to urge the first and second arcuate members to a closed position. Also disposed within the housing is a push button having a body portion disposed between the first and second arcuate members for urging at least one arcuate member to an open position when the button is pressed. The first and second arcuate members project freely from the housing and are releaseably engageable to form a closed loop. Pushing the button inward into the housing forces at least one arcuate member to pivot open forming a gap between the first and second arcuate members. The arcuate members have a cross-sectional configuration that permits either arcuate member to be inserted through the perforation of the collar stay. Collar stays may then be placed upon or removed from either arcuate member while the arcuate members are in the open position. Removing pressure from the button engages the arcuate members thereby forming a closed loop. In the closed configuration, the collar stay storage device maintains the perforated collar stays in an orderly arrangement. The compact size of the collar stay storage device minimizes space required to store collar stays making the storage device suitable for use in dresser drawers, closet spaces, suitcases, toiletry kits, garment bags, purses or pockets.

Preferably, a magnet is attached to the outer housing surface of the storage device. The storage device may then be magnetically attached to the outer surface of the base member of the collar stay perforating device, which is preferably made of steel. The magnet enables the collar stay perforating device and the collar stay storage device to be kept together. This is advantageous for as soon as a collar stay is perforated, the collar stay may be placed on the storage device preventing damage and/or misplacement of the collar stay.

In accordance with another aspect of the invention, a device for perforating and storing a collar stay device is provided. The perforating device comprises a body member defining a guide adapted to receive one end of a collar stay. The guide includes a punch hole. A punch member associated with and/or pivotally attached to the body member forms a hole in the collar stay when the body member and punch member are brought together and a collar stay is inserted into the guide. The perforating device may have a single lever or a double lever configuration. The perforating and storage device further comprises an elongated member for carrying a plurality of collar stays having a hole. The elongated member has a cross-sectional configuration that permits the elongated member to be inserted through the hole in the collar stay to carry the collar stay on the elongated member. The elongated member is preferably configured as a selectively releasable loop or ring that opens and closes allowing perforated collar stays to be added to and removed from the elongated member. The elongated member preferably includes first and second arm members in a pivotal relation that engage to form a closed loop and disengage to form a gap between the arm members.

In accordance with another aspect of the present invention, a method for perforating a collar stay is provided. The method comprises providing a punch device having a punch hole member pivotally attached to a punch member. The punch device is adapted to accommodate a collar stay and the punch member and the punch hole are adapted to cooperate with each other. The method includes placing a portion of the collar stay over the punch hole member and moving the punch member through the portion of the collar stay and into cooperation with the punch hole member to form a perforation within the collar stay.

In accordance with another aspect of the present invention a method for storing a collar stay is provided. The method includes providing a punch device having a punch hole member pivotally attached and in cooperation with a punch member, the punch hole member and the punch member adapted to accommodate the width and depth of the collar stay. The method further includes placing a portion of the collar stay over the punch hole member, and moving the punch member through the collar and into cooperation with the punch hole member to form a perforation within the collar stay. The method also includes providing a first arcuate member pivotally related and releaseably engageable with a second arcuate member to form a closed loop. The method entails opening the loop to form a gap between the arcuate members, inserting an arcuate member through the collar stay perforation and engaging the first and second arcuate members to maintain the collar stay on the closed loop.

In accordance with another aspect of the present invention, a method for storing a collar stay is provided, the method including perforating the collar stay and providing an openable ring member which has releaseably engageable arm members for forming a closed loop. The method further includes disengaging the arm members to provide a gap between the arm members, inserting an arm into the collar stay perforation, engaging the arm members to form a closed loop, and maintaining the perforated collar stay within the closed loop.

In accordance with another aspect of the invention, a method for storing a collar stay is provided. The method includes providing a first member having a body that defines a guide to receive one end of a collar stay and a punch member associated with the body for forming a hole in the collar stay received in the guide. The method further entails placing a portion of the collar stay into the body, moving the punch member through the portion of the collar stay to form a perforation within the collar stay, and providing an openable ring member which has releaseably engageable arm members for forming a closed loop. The method further includes disengaging the arm members to provide a gap between arm members, inserting an arm member into the collar stay perforation, engaging the arm members to form a closed loop and maintaining the perforated collar stay within the closed loop.

DETAILED DESCRIPTION OF THE PREFERRED EMBODIMENTS

1. Collar Stay Perforating Device

Figure 1:
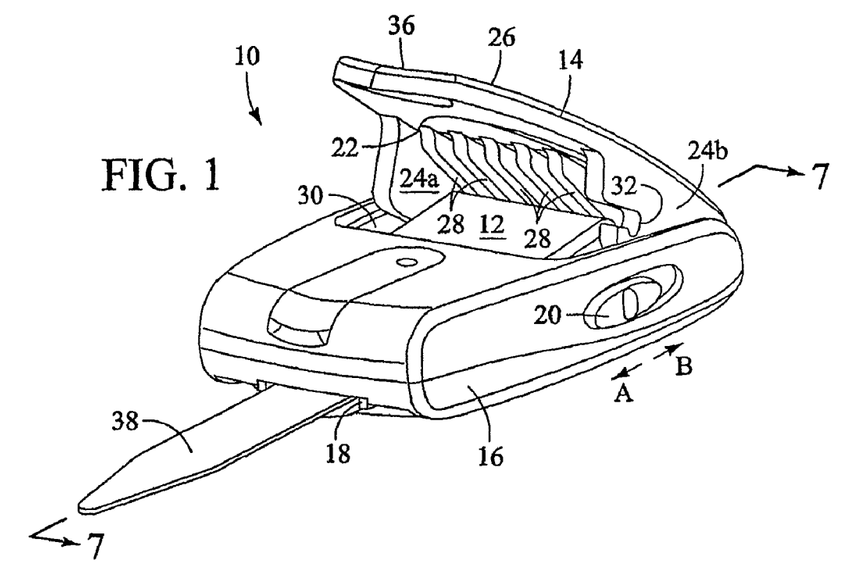
FIG. 1 is a front perspective view of the collar stay perforating device in an open position with a collar stay extending therefrom in accordance with the present invention.
Figure 2:
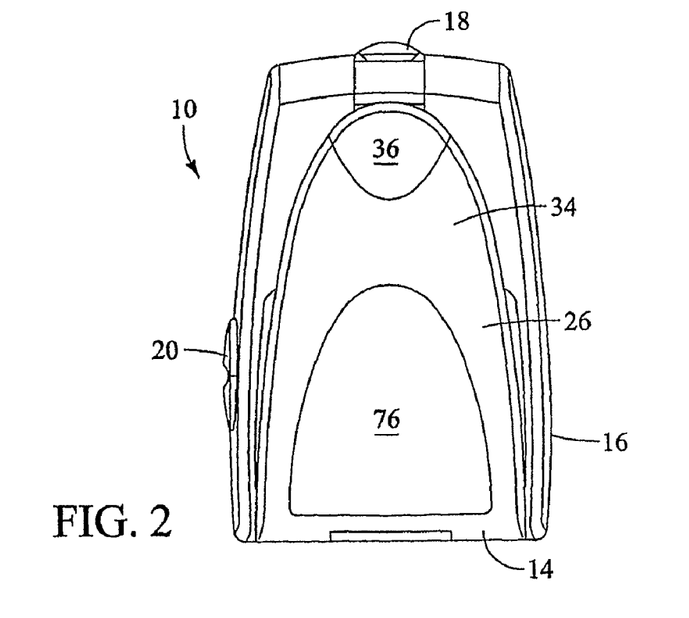
FIG. 2 is a top plan view of the collar stay perforating device.

Referring to the FIGURES generally, where like reference numerals denote like structure and elements, and in particular to FIGS. 1 and 2, a collar stay perforating device 10 is depicted comprising a first lever member 12, a second lever member 14, a housing 16 and a guide slot 18 through which a collar stay 38 is inserted into device 10. Housing 16 further includes a releasable latch 20. Moving latch 20 in the direction of arrow A opens device 10. Movement of latch 20 in the direction of arrow B closes device 10. Housing 16 has an opening 30 which allows second lever member 14 to rise from housing 16, when latch 20 is moved to the open position. FIG. 1 illustrates an open configuration of device 10 whereupon second lever member 14 is raised exposing an inner surface 22 of second lever member 14. Second lever member 14 also has first and second side walls 24a and 24b as well as a top panel 26. A portion of first lever member 12 contacts or bears upon a portion of inner surface 22 as will be discussed in detail later. Preferably, inner surface 22 includes a plurality of protruding ridges 28 which contact the outer surface of first lever member 12.

Figure 3:
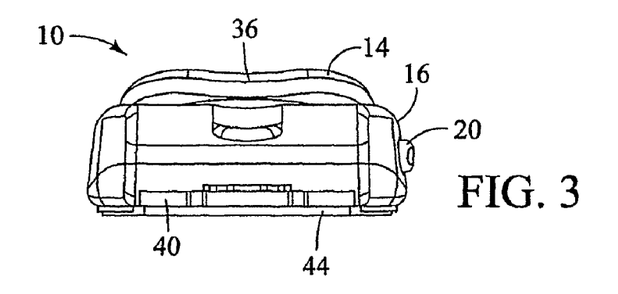
FIG. 3 is front elevation view of the collar stay perforating device.
Figure 5:
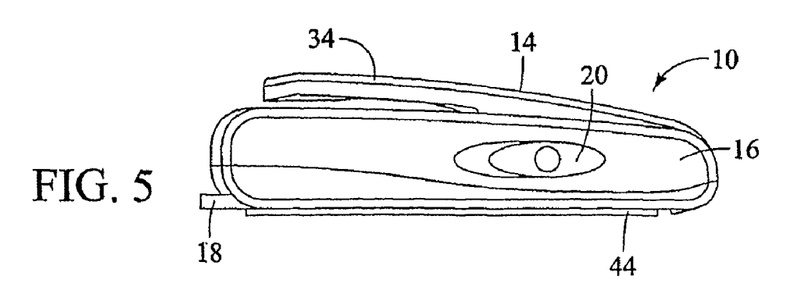
FIG. 5 is a side elevation view of the collar stay perforating device.

First and second lever members 12 and 14 are pivotable or otherwise movable within housing 16. Housing 16 limits the movement of first lever member 12. Second sidewall 24b has a notch 32 which cooperates with latch 20 to maintain device 10 in a closed position as shown in FIGS. 3 and 5. Top panel 26 conceals opening 30 when device 10 is in the closed configuration. Top panel 26 also includes an extended portion 34 which extends over a portion of the upper surface of housing 16 when latch 20 and notch 32 cooperatively engage to maintain device 10 in a closed position. Extended portion 34 may include a finger depression 36 to assist in finger placement during use of device 10.

Figure 4:
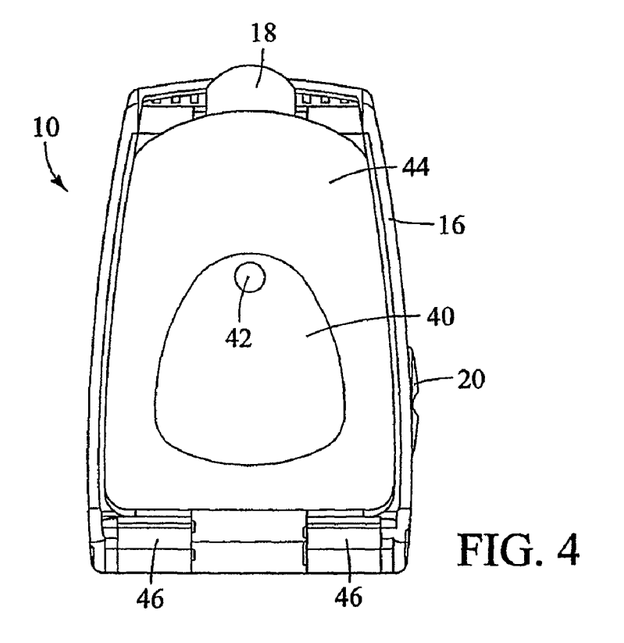
FIG. 4 is a bottom view of the collar stay perforating device.

Device 10 further comprises a base member 40 having a discharge orifice 42 and a pad 44 as shown in FIGS. 3-5. A pivot attachment 46 between base member 40 and second lever member 14 is shown in FIG. 4. Pad 44 may be attached to the exterior surface of base member 40 as is commonly known to those skilled in the art, with adhesive attachment preferred. Preferably, pad 44 is made of rubber, a soft plastic, or similar material to provide a soft, non-scratch imposing lowermost surface for device 10.

Figure 6:
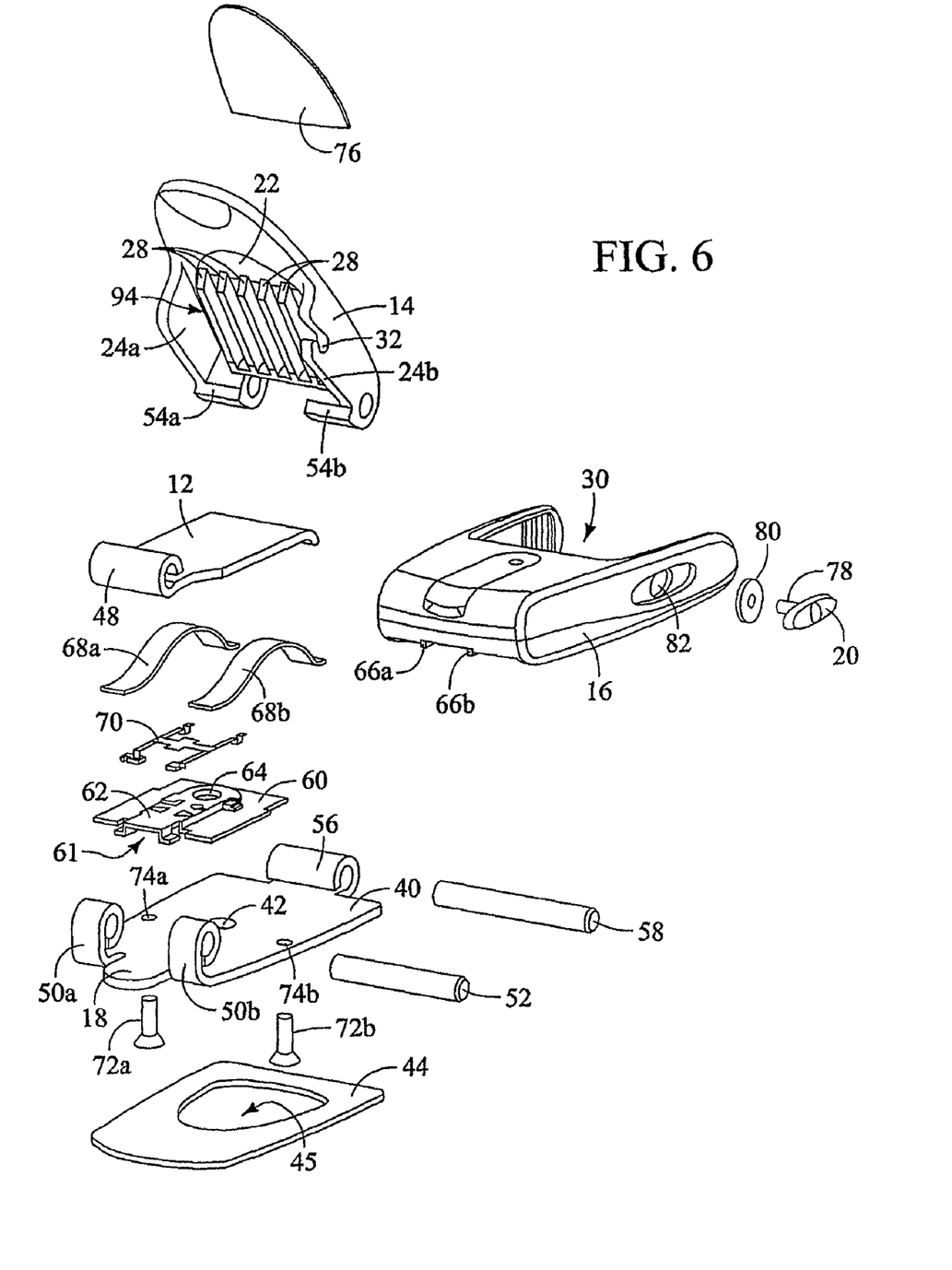
FIG. 6 is an exploded front perspective view of the collar stay perforating device.

The internal components of device 10 are best seen in the exploded view provided by FIG. 6. First lever member 12 includes a hinge portion 48 which cooperatively fits with first hinge portions 50a and 50b of base member 40. A hinge pin 52 secures hinge portion 48 to first hinge portions 50a and 50b thereby providing a pivot attachment 53 between base member 40 and first lever member 12. Similarly, second lever member 14 has hinge portions 54a and 54b that cooperate with a second hinge portion 56 of base member 40. A hinge pin 58 secures hinge portions 54a and 54b to second hinge portion 56 to provide a pivot attachment 46 between base member 40 and second lever member 14. A guide plate 60 corresponding to guide slot 18 is placed upon base member 40 and is aligned with guide slot 18 to create a guide pathway 61. Guide plate 60 further comprises a raised surface 62 having a punch hole 64. Guide plate 60 is positioned on base member 40 so as to align punch hole 64 with discharge orifice 42. Housing 16 has tracks 66a and 66b corresponding to the perimeter of raised surface 62. Tracks 66a and 66b properly align guide pathway 61 with guide slot 18 and secure guide plate 60 on base member 40 when housing 16 is secured to base member 40. One of ordinary skill in the art will recognize that the width of guide slot 18 and guide pathway 61 may be adapted to accommodate collar stays of varying widths and depths.

Leaf springs 68a and 68a are secured in place on guideplate 60 by a spring clamp 70. First lever member 12 pivots so that the inner surface of first lever member 12 rests upon leaf springs 68a and 68b. Screws 72a and 72b insert through corresponding screw holes 74a and 74b and into screw seats (not shown) in housing 16 thereby securing base member 40 to housing 16. A decorative inlay 76, preferably made of a shiny metal, may be adhesively secured to the exterior surface of top panel 26. Pad 44 may be adhesively secured to the exterior surface of base member 40. Pad 44 has an opening 45 ensuring discharge orifice 42 is not obstructed. Latch 20 has a protruding portion 78 which extends through a washer 80 and through a latch hole 82 in housing 16. When device 10 is in a closed position, protruding portion 78 engages notch 32 and maintains device 10 in a closed configuration. Moving latch 20 in the direction of arrow A (see FIG. 1) disengages protruding portion 78 from notch 32. The force exerted upon first lever member 12 by leaf springs 68a and 68b urges the exterior surface of first lever member 12 to bear upon inner surface 22 thereby raising second lever member 14 above housing 16.

Inner surface 22 of second lever member 14 includes a bearing surface 94. Bearing surface 94 preferably includes a plurality of protruding ridges 28. Ridges 28 may be made of any wear-resistant material as is commonly known in the art including such non-limiting examples as metal or plastic with glass filled nylon being preferred.

Preferably, base member 40, first lever member 12, guideplate 60 hinge pins 52 and 58, leaf springs 68a and 68b, spring clamp 70, are made of a hard, durable, wear-resistant material. Suitable materials for these components may include plastic, or a metal such as steel. Preferred is cold rolled steel with spring steel preferred for leaf springs 68a and 68b and spring clamp 70.

Figure 7:
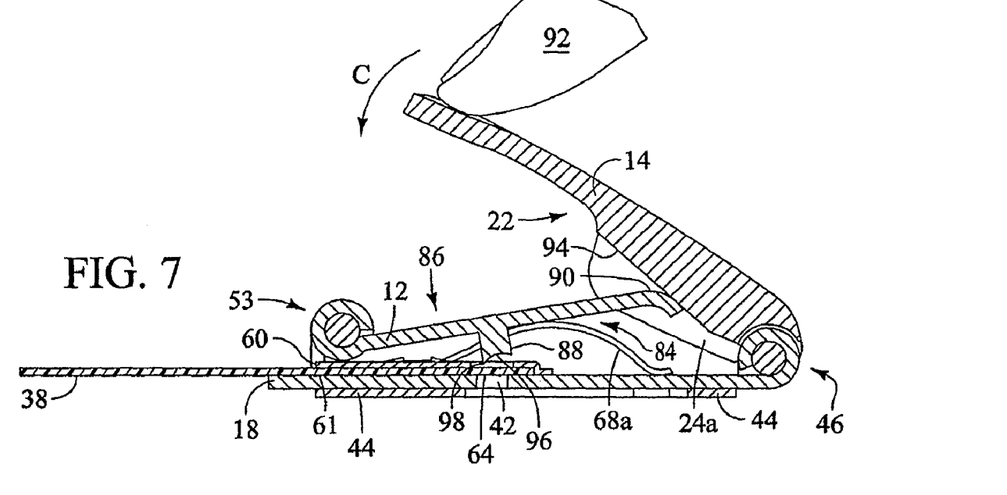
FIG. 7 is sectional view taken along line 7-7 of FIG. 1 of the collar stay perforating device having a collar stay inserted therein and the housing removed.
Figure 8:
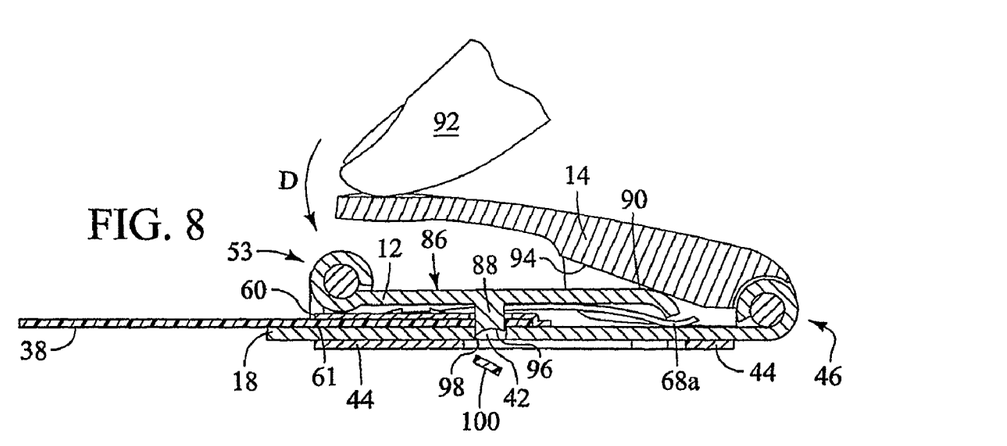
FIG. 8 is a sectional view taken along line 7-7 of FIG. 1 of the collar stay perforating device having a collar stay inserted therein and the housing removed.

Housing 16 is omitted from FIGS. 7 and 8 to better illustrate the operation of collar stay punch device 10. First lever member 12 has an inner surface 84 and an outer surface 86. A punch member 88 extends from the inner surface 84. Punch member 88 is designed and positioned on inner surface 84 to cooperate with punch hole 64. Located distally from pivot attachment 53 is a curved portion 90 of first lever member 12. The inward curve of curved portion 90 provides a rounded or otherwise smooth contact surface between outer surface 88 and bearing surface 94 of second lever member 14.

The user of device 10 initially releases latch 20 to raise second lever member 14 from housing 16 to place device 10 in an open position. The user then inserts an end of collar stay 38 into guide slot 18 and slides collar stay 38 through guide pathway 61 until a portion of collar stay 38 extends under punch hole 64. A user's finger 92 then moves second lever member 14 toward base member 40 as indicated by arrow C in FIG. 7. This downward motion brings bearing surface 94 of second lever member 14 into contact with curved portion 90 of first lever member 12. Curved portion 90 preferably contacts bearing surface 94 proximate pivot attachment 46 to increase the torque potential afforded by the double lever configuration of device 10.

As user's finger 92 moves second lever member 14 downward, the user initially experiences resistance from leaf springs 68a and 68b. As the downward motion continues, the user then experiences greater resistance as punch member 88 inserts into punch hole 64 whereupon a cutting edge 96 of punch member 88 engages collar stay 38. Collar stay 38 may be made of any material as is commonly known in the art including such non-limiting examples as plastic, paper, cardboard or a metal such as steel, stainless steel, brass, gold, silver or nickel.

Preferably, cutting edge 96 has a protrusion 98 for initially piercing collar stay 38. Cutting edge 96 and protrusion 98 are hard, sharpened surfaces and may or may not be made of the same material as first lever member 12. Preferred are cutting edge 96 and protrusion 98 made from cold rolled steel. Protrusion 98 is preferably located on the portion of punch member 88 closest to pivot attachment 53 further increasing the torque potential of device 10. With the downward force provided by user's finger 92, protrusion 98 pierces an initial hole in collar stay 38 with a minimal amount of force from user's finger 92. As user's finger 92 continues to apply a downward force, the rest of cutting edge 96 engages collar stay 38 at the puncture point and cuts along the circumference of punch hole 64. User's finger 92 continues to move second lever member 14 downward as indicated by arrow D in FIG. 8 until the entire cutting edge 96 cuts through collar stay 38 bringing punch member 88 into full cooperation with punch hole 64. Punch member 88 subsequently discharges a perforate 100 through discharge orifice 42. The initial hole formed by protrusion 98 and the gradual cutting by cutting edge 96 contribute to reduce the shearing force required to fully perforate collar stay 38 by avoiding the simultaneous engagement of the entire cutting surface with collar stay 38. Removal of user's finger 92 from second lever member 14 enables the resistance from leaf springs 68a and 68b to urge second lever member 14 to rise above housing 16. The user may then remove collar stay 38 from guide pathway 61.

In view of the operational aspects of device 10, it will be apparent to the skilled artisan that housing 16 also provides several safety features. Housing 16 prevents the user's fingers or clothing from becoming caught or pinched between the first and second lever members, as well as between the pivot attachments of each lever. In addition, the restriction of pivotal movement imposed upon first lever member 12 by housing 16 protects the user from the sharpened surfaces of cutting edge 96 and protrusion 98.

Figure 9:
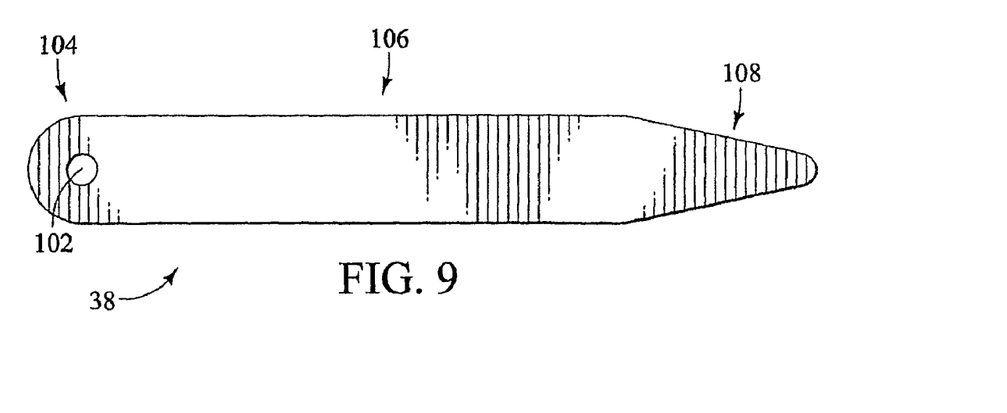
FIG. 9 is a top plan view of a perforated collar stay in accordance with the present invention.

Punch member 88, cutting edge 96 and punch hole 64 may be designed as is commonly known in the art to provide any desired shape perforation in collar stay 38. Such shapes may include, but are not limited to, square, triangular, round, or elliptical. Once removed from guide pathway 61, collar stay 38 exhibits a clean-cut perforation 102 as shown in FIG. 9. Preferably, perforation 102 is round in shape.

One of ordinary skill in the art will readily realize that either end of collar stay 38 may be perforated with device 10. FIG. 9 shows one embodiment wherein perforation 102 is located in a round end portion 104 of collar stay 38. However, device 10 may be used to readily apply a perforation to any portion of collar stay 38. Such portions may include a middle portion 106 as well as the pointed portion 108 of collar stay 38. The skilled artisan will further recognize that device 10 may be employed to apply multiple perforations to collar stay 38. In such a situation, guide pathway 61 may be adapted to have no restraint thereby enabling collar stay 38 to be inserted through guide pathway 61 so that at least the longitudinal midpoint of collar stay 38 extends under punch hole 64. Alternatively, guide slot 18 and guide pathway 61 may be situated within housing 16 to allow collar stay 38 to be inserted into one end of housing 16 and removed from an opposing end of housing 16. Such a configuration would facilitate the rapid application of multiple perforations to the collar stay.

The double lever configuration of device 10 greatly reduces the force required to perforate a collar stay. Device 10 is readily hand operated by placing second lever member 14 and base 40 between the thumb and forefinger, and squeezing the thumb and forefinger together in a closing motion. Manual use of device 10 provides sufficient force to comfortly perforate collar stays having a thickness between 0.0005 inches to about 0.05 inches. Best results are achieved when device 10 is used to perforate plastic collar stays. Metal collar stays may also be perforated with the present invention.

The double lever configuration of the present invention also contributes to the compactness of device 10. Device 10 has length between about 2.5 inches to about 3.5 inches, a width between about 1.0 inches to about 2.0 inches, and a height between about 1.0 inches to about 2.0 inches. This is advantageous as device 10 takes up minimal space in drawers, suitcases, garment bags and the like. The compactness of device 10 promotes portability as device 10 readily fits in purses, travel kits, toiletry or accouterment kits, and even pockets.

2. Collar Stay Storage Device

Upon perforating a collar stay with device 10, a collar stay storage device 200 is provided to store perforated collar stays as shown in FIGS. 10-14. Device 200 includes first and second arcuate members 202a and 202b, a housing 204, a cover member 206 and a push button 208. A portion of each first and second arcuate member 202a and 202b extends into housing 204 through openings 205a and 205b respectively. Housing 204 thereby maintains first and second arcuate members 202a and 202b in a pivotal relation to each other as will be described in detail below.

Figures 10, 11:
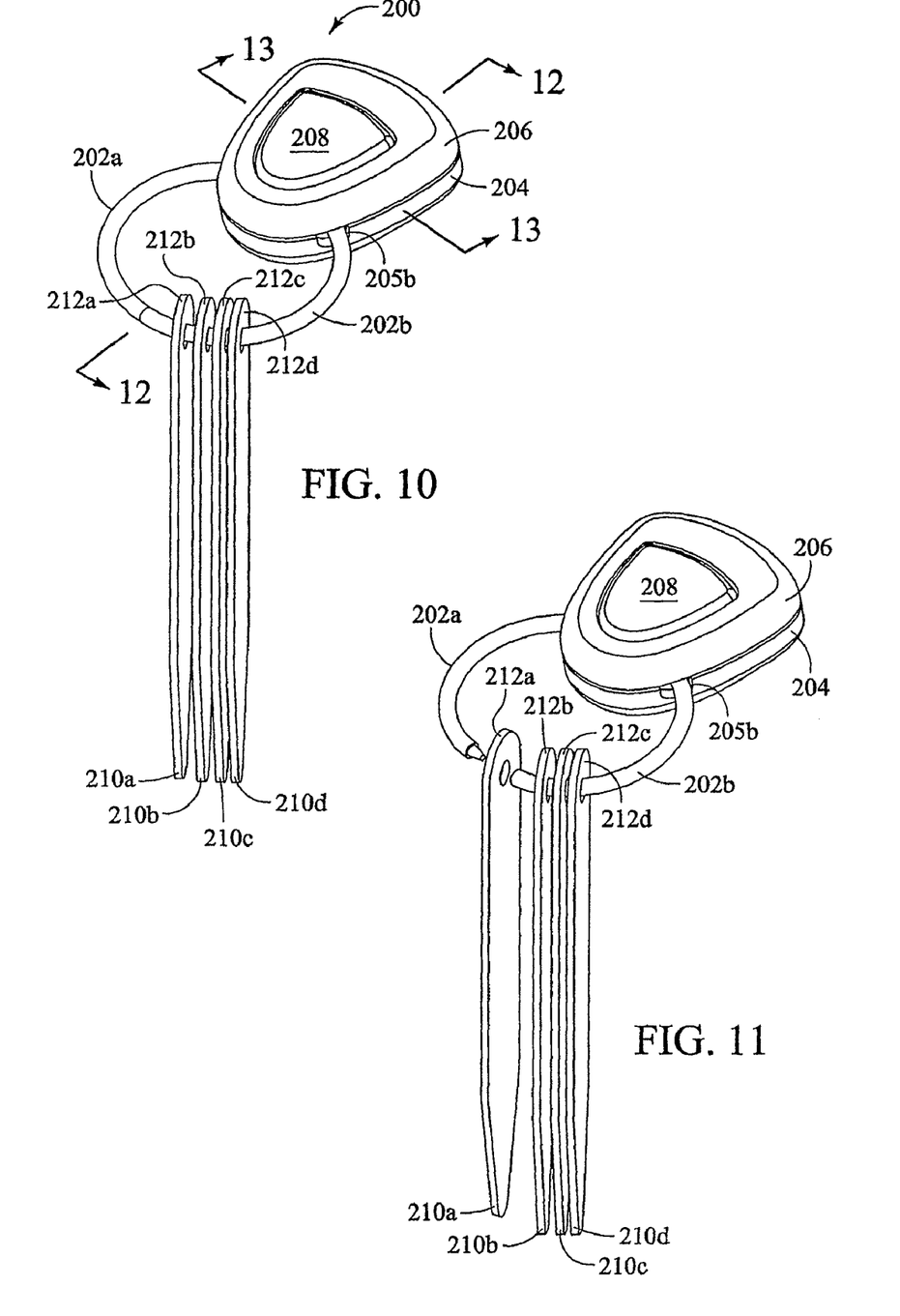
FIG. 10 is a front perspective view of a collar stay storage device in a closed position in accordance with an alternate embodiment of the present invention.
FIG. 11 is a front perspective view of the collar stay storage device in an open position.

FIG. 10 shows device 200 in a closed configuration wherein first and second arcuate members 202a and 202b are engaged to form a closed loop. Device 200 is particularly suited for the storage of perforated collar stays 210a, 210b, 210c, and 210d as the diameter for each of first and second arcuate members 202a and 202b is less than the diameter of the perforation in each collar stay. Each collar stay 210a, 210b, 210c and 210d has a corresponding perforation 212a, 212b, 212c, and 212d through which either first arcuate collar stay 202a or second arcuate collar stay 202b is readily inserted. Consequently, device 200 maintains collar stays 210a-210d in an ordered, arranged and readily usable manner.

A user pressing push button 208 disengages first arcuate member 202a from second arcuate member 202b. This provides a gap between first arcuate member 202a and second arcuate member 202b as shown in FIG. 11. In this open configuration, perforated collar stays may be placed onto storage device 200 by inserting either arcuate member through the perforation within the collar stay. FIG. 11 shows second arcuate member 202b being inserted through perforation 212a of collar stay 210a. It is preferred that the gap formed by opening arcuate members 202a and 202b is somewhat small, about 0.02 inches to about 0.10 inches, to reduce the chance that collar stays maintained on the arcuate members do not inadvertently slip or fall off device 200 upon addition or removal of another collar stay. After insertion of second arcuate member 202b through perforation 210a, the user releases pressure from button 208 and arcuate members 202a and 202b engage to form the closed loop, as shown in FIG. 10. Removal of a collar stay from device 200 is similar wherein button 208 is pressed to disengage the arcuate members 202a and 202b, a collar stay is moved to the gap and removed from either arcuate member. Device 200 may store as few as one or as many as about 30 perforated collar stays upon the closed loop formed by first and second arcuate members 202a and 202b.

Figure 15:
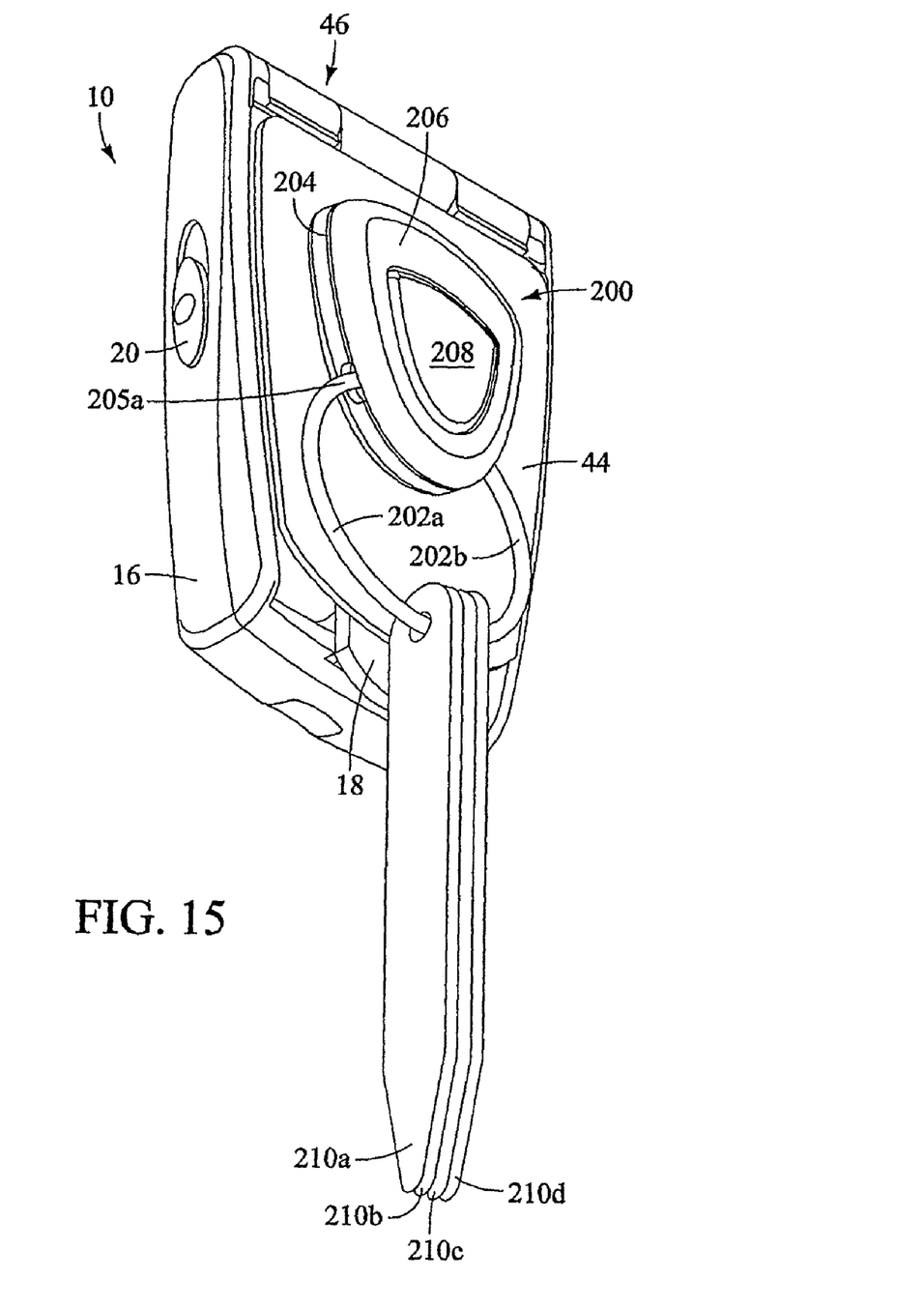
FIG. 15 is a perspective view of the collar stay storage device attached to the bottom of the collar stay perforating device in accordance with another aspect of the present invention.

One of ordinary skill in the art will realize that the selectively releasable closed loop or ring formed by the engagement of first and second arcuate members 202a and 202b may result in a variety of shapes. The arcuate members may engage to form a substantially circular loop as shown in FIGS. 10, 11 and 15. Alternatively, the shape of the arcuate members may be modified so that the shape of the closed loop may be any desired shape commonly known in the art including, but not limited to, square, rectangular, triangular, polygonal or elliptical.

Figure 14:
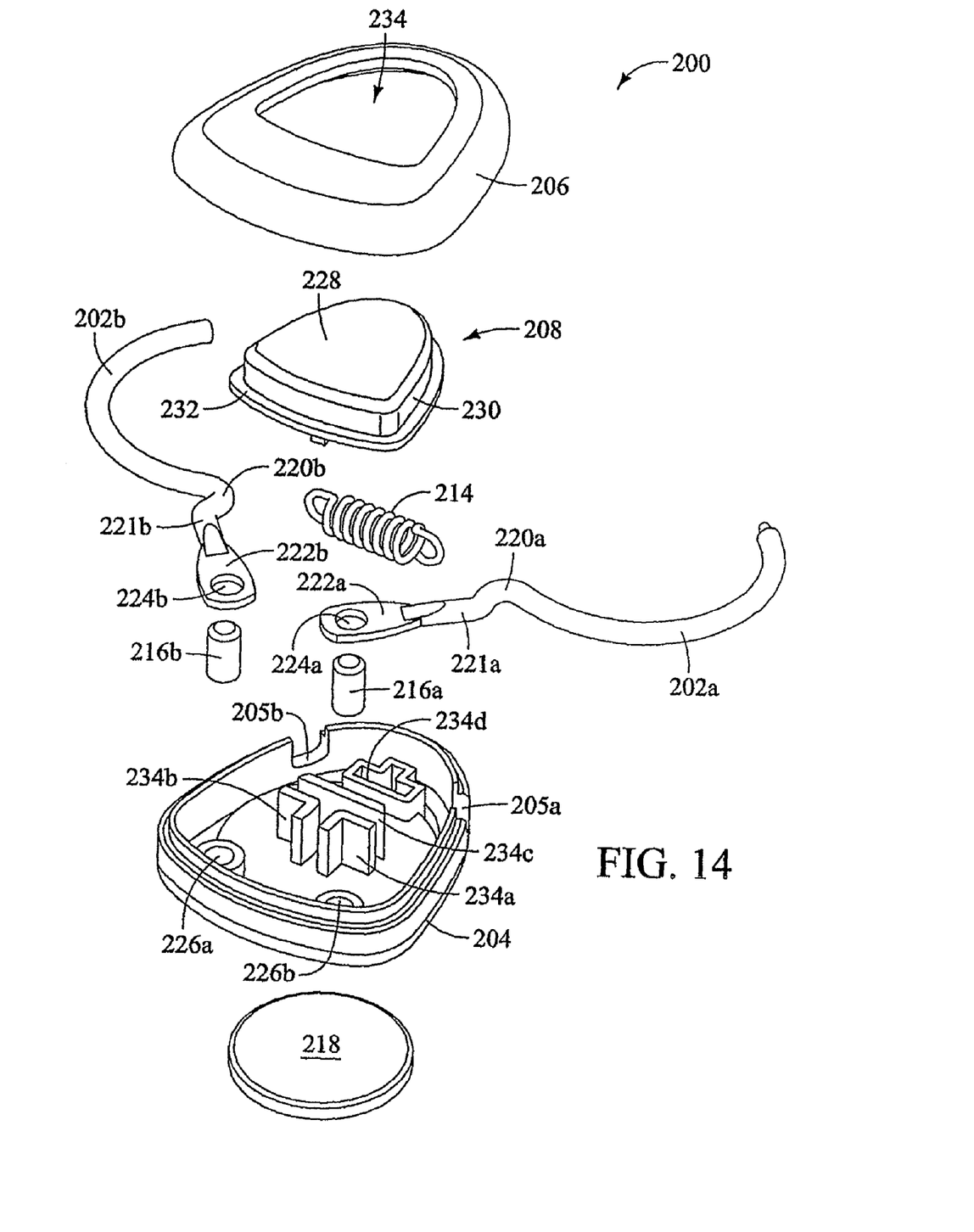
FIG. 14 is an exploded rear perspective view of the collar stay storage device.

As shown in FIG. 14, device 200 also includes a spring 214, pins 216a and 216b and a magnet 218. First and second arcuate members 202a and 202b respectively include first and second elbows 220a and 220b, first and second arm segments 221a and 221b, first and second flat portions 222a and 222b and first and second holes 224a and 224b. Pins 216a and 216b are disposed in respective pin seats 226a and 226b. Arcuate members 202a and 202b are mounted onto the exposed portions of seated pins 216a and 216b through respective holes 224a and 224b. This provides each arcuate member with pivotal movement. First and second flat portions 222a and 222b, first and second arm segments 222a and 222b and first and second elbows 220a and 220b are disposed within housing 204. The remaining portions of first and second arcuate members 202a and 202b extend through opening 205a and 205b respectively and project freely from housing 204 to form a closed loop. The ends of spring 214 are attached to elbow portions 220a and 220b to urge first and second arcuate members toward each other and into a closed position.

Figure 12:
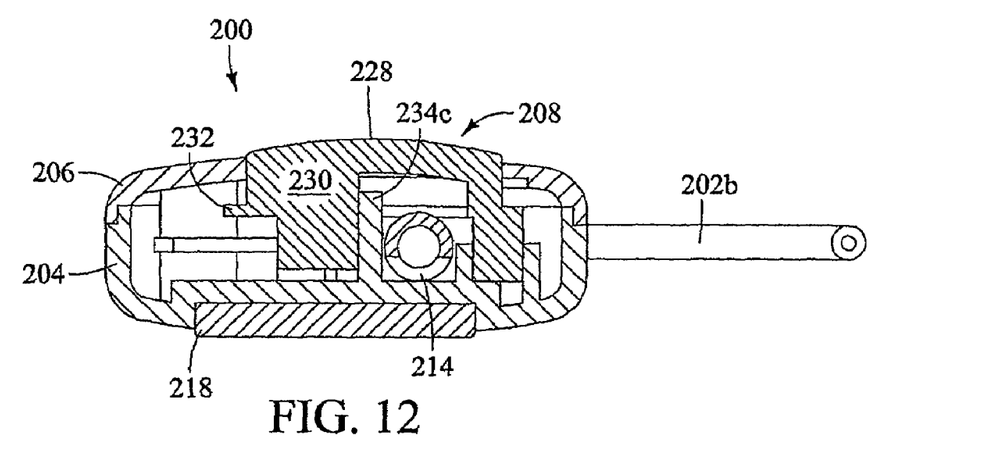
FIG. 12 is a sectional view taken along line 12-12 of FIG. 10.
Figure 13:
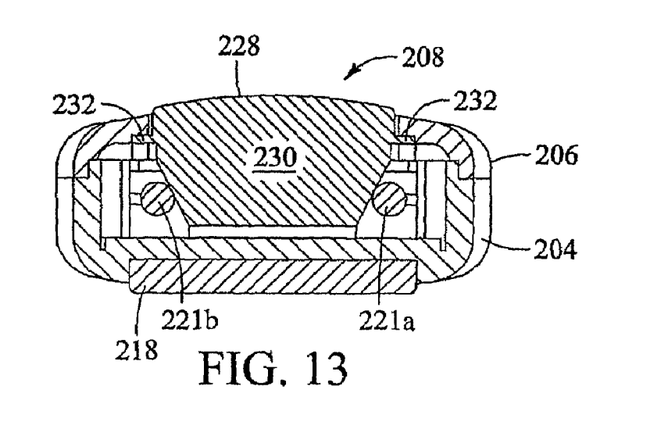
FIG. 13 is a sectional view taken along line 13-13 of FIG. 10.

Button 208 comprises an exterior surface 228 and a button body 230 as shown in FIG. 14. Button body 230 extends from exterior surface 228 inward into the interior of housing 204 with a portion of button body 230 extending between first and second arm segments 221a and 221b. Circumferentially disposed and integral to button body 230 is a lip 232 which extends outwardly. Lip 232 abuts against cover member 206 when device 200 is in a closed position. Lip 232 maintains button 208 within housing 204 as shown in FIGS. 12 and 13. Cover member 206 has an opening 234 corresponding to the shape of button exterior 228. Cover member 206 attaches to the top of housing 204 thereby enclosing device 200 and maintaining button 208, spring 214, pins 216a and 216b and portions of the arcuate members within housing 204 as previously described. Cover member 206 is secured to housing 204 as is commonly known in the art including, but not limited to, lip and groove attachment snap-on attachment or adhesively attached.

Housing 204 further includes button supports 234a, 234b, 234c, and 234d. Button supports 234a-234d guide the inward movement of button 208 when inward pressure is applied thereto placing device 200 in an open configuration. Spring 214 extends between button support 234c and 234d attaching to first and second elbow portions 220a and 220b as previously described. The cross-sectional shape of button body 230 is a wedge shape or otherwise tapered such that the width of button body 230 is greater proximate button exterior 228 than the width of button body 230 distal button exterior 230 as depicted in FIG. 13. As button 208 is pressed inward into housing 204, opposing outer surfaces of button body 230 are brought to bear upon first and second arm segments 221a and 221b. The inner movement of button 208 brings the widening cross-sectional configuration of button body 230 to bear upon first and second arm members 221a and 221b, gradually increasing the distance between the arm members. This causes at least one arcuate member to pivot about pin 216a or 216b thereby disengaging arcuate member 202a from 202b and providing a gap therebetween.

Housing 204, cover member 206 and button 208 may be made of any durable material including, but not limited to plastic, rubber or metal. Similarly, pins 216a and 216b, spring 214 and first and second arcuate members 202a and 202b are made of a durable material such as plastic or metal, with metal being preferred.

Magnet 218 is attached to the underside of device 200 as is commonly known in the art such as adhesive attachment, for example. Device 200 may then be magnetically attached to base member 40 of collar stay punch device 10 as shown in FIG. 15. Preferably, the shape of pad opening 45 conforms to the circumferential shape of housing 204 allowing magnet 218 to attach directly to the exterior surface of base 40. This is advantageous as collar stay perforating device 10 and collar stay storage device 200 may be stored together. Consequently, once a collar stay is perforated by device 10, it may immediately be placed upon storage device 200 before being bent, broken or misplaced.

Device 200 may used in conjunction with collar stay perforating device 10, or may be used separately. Similar to collar stay perforating device 10, an advantage of collar stay storage device 200 is its compactness, durability, and portability as well as its ease of operation. The length of device 200 is between about 1.5 inches to about 2.5 inches with the width being between about 0.5 inches to about 1.5 inches. The height of device 200 is about 0.3 inches to about 1.0 inch. Given these dimensions, device 200 is a handy garment accessory that is readily stowed in a dresser drawer, a suitcase, a garment bag, a car glove compartment, a toiletry kit, a purse or even a pocket with or without device 10. Given its ease of operation device 200 may also be used to store such ringed objects as keys, paper clips, rubber bands, hair bands and the like.

In another aspect of the present invention, device 200 may be used in conjunction with a mated attachment system. In this embodiment, an attachment component is affixed to the rear surface (i.e., the outer surface of housing 204 opposing button exterior 228) of device 200. A mated attachment component is provided to releaseably attach to the attachment component of device 200. The mated attachment component may then be affixed to any desired surface or structure that promotes ready access to the collar stays maintained by device 200. For example, the mated attachment component may be affixed to a closet wall adjacent the closet area where shirts and/or blouses are stored. Attaching device 200 to the mated attachment component thereby enables a person to conveniently retrieve collar stays from device 200 for use with a shirt or blouse as the shirt is retrieved for wear. The mated attachment component may be affixed to any surface or structure that is able to provide a suitable mounting platform for device 200. Such surfaces or structures may include the interior wall of a dresser, suitcase, garment bag or toiletry kit or even a bathroom wall. Consequently, device 200 may be moved from one mated attachment component (i.e., a mated attachment component affixed to a closet wall) to another mated attachment component (i.e., a mated attachment component affixed to an inner wall of a garment bag) providing device 200 the versatility of use at home or during travel. The mated attachment system may be any releasable attachment system as is commonly known in the art wherein the attachment component and mated attachment component may include such non-limiting examples as a magnet and an iron-bearing metal or metal alloy, a hook or loop attachment system, a lip and groove attachment, and a snap and clip attachment. The attachment component may be affixed to device 200 as is commonly known in the art with adhesive attachment preferred. Likewise, mated attachment component may be affixed to any suitable structure or surface as is commonly known in the art with adhesive attachment preferred.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A device for storing at least one perforated collar stay comprising:
    first and second arcuate members releasably engageable to form a closed loop, at least one arcuate member being pivotable; and
    a collar stay having a perforation, and an arcuate member extending through the perforation.

2. The device of claim 1 further comprising a housing for maintaining the first and second arcuate members in a pivotal relation to each other, said arcuate members projecting freely from the housing.

3. The device of claim 2 further comprising a spring member disposed between the first and second arcuate members for urging said arcuate members to a closed position; and
    a push button disposed within the housing, the push button having a body wherein a portion of the body is disposed between the first and second arcuate members for urging at least one arcuate member to an open position when the button is pressed.

4. The device of claim 3 wherein said first and second arcuate members are in a closed position when the button is not pressed.

5. The device of claim 3 wherein the button body has a wedge-shaped cross section.

6. The device of claim 5 wherein the push button further comprises an exposed surface and the width of the button body proximate the exposed surface is greater than the width of the body portion distal the exposed surface.

7. The device of claim 1 wherein the shape of the closed loop is selected from the group consisting of circular, square, rectangular, triangular, polygonal, and elliptical.

8. The device of claim 1 further comprising an attachment component releasably attachable to a surface of the device.

9. The device of claim 8 wherein the attachment component is affixed to a support surface.

* * * * *

UNITED STATES PATENT AND TRADEMARK OFFICE
CERTIFICATE OF CORRECTION

PATENT NO. : 7,578,034 B2
APPLICATION NO. : 10/440592
DATED : August 25, 2009
INVENTOR(S) : Bier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Seventh Day of September, 2010

David J. Kappos
*Director of the United States Patent and Trademark Office*